(12) United States Patent
Yockey et al.

(10) Patent No.: US 6,674,188 B2
(45) Date of Patent: Jan. 6, 2004

(54) LIQUID COOLED ALTERNATOR

(75) Inventors: Steven J. Yockey, Ypsilanti, MI (US); Kevin Roy Harpenau, Ypsilanti, MI (US); David William Linden, Ann Arbor, MI (US); Tony Militello, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 24 days.

(21) Appl. No.: 10/087,540

(22) Filed: Mar. 1, 2002

(65) Prior Publication Data

US 2003/0164650 A1 Sep. 4, 2003

(51) Int. Cl.[7] .................................................. H02K 9/00

(52) U.S. Cl. ....................................................... 310/52

(58) Field of Search .............................. 310/52, 54, 58, 310/64

(56) References Cited

U.S. PATENT DOCUMENTS

| | | | |
|---|---|---|---|
| 2,294,586 A | 9/1942 | Troller | |
| 2,479,223 A | 8/1949 | Haas | |
| 4,262,224 A | 4/1981 | Kofink et al. | |
| 4,418,295 A | 11/1983 | Shiga | |

(List continued on next page.)

FOREIGN PATENT DOCUMENTS

| | | |
|---|---|---|
| EP | 0 300 063 | 1/1989 |
| EP | 0 539 339 | 4/1993 |
| JP | 54-46306 | 4/1979 |
| JP | 55-66249 | 5/1980 |

(List continued on next page.)

OTHER PUBLICATIONS

English translation of Abstract corresponding to European Patent No. 0 539 339.
English translation of Abstract corresponding to Japanese Patent No. 54-46306.
English translation of Abstract corresponding to Japanese Patent No. 55-66249.
English translation of Abstract corresponding to Japanese Patent No. 56-1749.
English translation of Abstract corresponding to Japanese Patent No. 56-53555.
English translation of Abstract corresponding to Japanese Patent No. 56-86052.
English translation of Abstract corresponding to Japanese Patent No. 57-6551.
English translation of Abstract corresponding to Japanese Patent No. 62-160055.
English translation of Abstract corresponding to Japanese Patent No. 77357.

*Primary Examiner*—Nestor Ramirez
*Assistant Examiner*—Nguyen N Hanh
(74) *Attorney, Agent, or Firm*—Brinks Hofer Gilson & Lione

(57) ABSTRACT

An alternator comprising an inner housing, an outer housing mounted over the inner housing and a plurality of o-rings positioned between the inner housing and the outer housing thereby creating a sealed flow chamber having a first plenum, an axial jacket, a second plenum, a first passageway interconnecting the first plenum and the axial jacket, a second passageway interconnecting the axial jacket and the second plenum, an inlet extending from the first plenum, and an outlet extending from the second plenum. The first and second plenums are disk shaped cavities extending diametrically across the alternator, and the axial jacket is an annular jacket extending around the alternator. The first passageway is located diametrically across from the inlet and the second passageway is located diametrically across from the first passageway. The outlet is located diametrically across from the second passageway.

8 Claims, 4 Drawing Sheets

U.S. PATENT DOCUMENTS

| | | | |
|---|---|---|---|
| 4,464,594 | A | 8/1984 | Matsumoto et al. |
| 4,488,070 | A | 12/1984 | Iwaki et al. |
| 4,617,485 | A | 10/1986 | Nakamura et al. |
| 4,659,950 | A | 4/1987 | Gotoh |
| 4,686,399 | A | 8/1987 | Imori et al. |
| 4,739,204 | A | 4/1988 | Kitamura et al. |
| 4,757,221 | A | 7/1988 | Kurihashi et al. |
| 4,794,285 | A | 12/1988 | Nimura et al. |
| 4,818,906 | A | 4/1989 | Kitamura et al. |
| 4,870,307 | A * | 9/1989 | Kitamura et al. .............. 310/54 |
| 4,994,700 | A * | 2/1991 | Bansal et al. ................ 310/215 |
| 5,021,696 | A | 6/1991 | Nelson |
| 5,028,826 | A | 7/1991 | Kitamura |
| 5,093,591 | A | 3/1992 | Kitamura et al. |
| 5,095,235 | A | 3/1992 | Kitamura |
| 5,149,997 | A | 9/1992 | Suomela |
| 5,194,770 | A | 3/1993 | Yoshioka et al. |
| 5,233,255 | A | 8/1993 | Kusumoto et al. |
| 5,235,229 | A | 8/1993 | Tanaka et al. |
| 5,241,230 | A | 8/1993 | Tanaka et al. |
| 5,250,863 | A * | 10/1993 | Brandt ......................... 310/54 |
| 5,250,864 | A | 10/1993 | Kusumoto et al. |
| 5,293,089 | A | 3/1994 | Frister |
| 5,306,977 | A | 4/1994 | Hayashi |
| 5,317,224 | A * | 5/1994 | Ragaly ......................... 310/58 |
| 5,345,132 | A | 9/1994 | Sasaki et al. |
| 5,424,600 | A | 6/1995 | Ishikawa et al. |
| 5,561,334 | A | 10/1996 | Ishida et al. |
| 5,670,838 | A * | 9/1997 | Everton ........................ 310/254 |
| 5,705,865 | A | 1/1998 | Ishida et al. |
| 5,710,467 | A | 1/1998 | Irie et al. |
| 5,742,107 | A | 4/1998 | Asao et al. |
| 5,751,079 | A | 5/1998 | Bagherpour et al. |
| 5,763,968 | A | 6/1998 | Hayashi et al. |
| 5,777,407 | A | 7/1998 | Ishida et al. |
| D401,319 | S | 11/1998 | Bradley |
| 5,952,749 | A | 9/1999 | Umeda et al. |
| 5,977,668 | A | 11/1999 | Yoshioka |
| 5,977,669 | A | 11/1999 | Yoshida et al. |
| 6,018,205 | A | 1/2000 | Ohashi et al. |
| 6,023,112 | A | 2/2000 | Asao |
| 6,057,627 | A | 5/2000 | Ragaly |
| 6,060,802 | A | 5/2000 | Masegi et al. |
| 6,124,660 | A | 9/2000 | Umeda et al. |
| 6,172,433 | B1 | 1/2001 | Asao |
| 6,198,187 | B1 | 3/2001 | Asao et al. |
| 6,198,188 | B1 | 3/2001 | Ihata |
| 6,285,100 | B1 | 9/2001 | Pflueger et al. |
| 2001/0010434 | A1 | 8/2001 | Ishida et al. |
| 2001/0026102 | A1 | 10/2001 | Asao et al. |
| 2001/0054852 | A1 | 12/2001 | Nakamura et al. |

FOREIGN PATENT DOCUMENTS

| | | |
|---|---|---|
| JP | 56-1749 | 1/1981 |
| JP | 56-86052 | 7/1981 |
| JP | 57-6551 | 1/1982 |
| JP | 62-160055 | 7/1987 |
| JP | 63-77357 | 4/1988 |
| JP | 63-181637 | 7/1988 |
| JP | 63-265545 | 11/1988 |
| JP | 63-274342 | 11/1988 |
| JP | 56-53555 | 5/1991 |
| JP | 3-235644 | 10/1991 |
| JP | 3-265450 | 11/1991 |
| JP | 4-244770 | 9/1992 |
| JP | 5-111221 | 4/1993 |
| JP | 5-111222 | 4/1993 |
| JP | 5-137297 | 6/1993 |
| JP | 5-219685 | 8/1993 |
| JP | 5-236701 | 9/1993 |
| JP | 5-268749 | 10/1993 |
| JP | 5-336704 | 12/1993 |
| JP | 6-78479 | 3/1994 |
| JP | 6-78504 | 3/1994 |
| JP | 6-98511 | 4/1994 |
| JP | 6-113505 | 4/1994 |

* cited by examiner

LIQUID COOLED ALTERNATOR

FIELD OF INVENTION

The invention relates to an automotive electrical alternator, and particularly to an alternator having coolant channels adapted to pass liquid engine coolant through the alternator for cooling the alternator.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; increasingly sophisticated powertrain control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

Further, designers of these devices strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

One concern with higher power producing alternators is heat production. Fans mounted on the front of the alternator will circulate air across the front side to help cool the alternator, however, with higher output alternators, there is too much heat produced to be dissipated by these fans. Liquid cooled alternators dissipate the heat more effectively, but require extra size to accommodate cooling flow channels. A related issue is noise generation. Air cooled alternators generate fan noise, which may be objectionable to vehicle occupants. Liquid cooling of alternators is a known technique for making alternators more quiet than air cooled alternators.

Therefore, there is a need for an improved alternator having flow channels to allow the alternator to be liquid cooled while still maintaining a small compact size.

SUMMARY OF THE INVENTION

In a first aspect of the present invention, an alternator includes an inner housing and an outer housing mounted over the inner housing with a pair of o-rings positioned therebetween to define a sealed flow chamber having a first plenum, a second plenum, and an axial jacket interconnecting the first and second plenums.

In another aspect of the present invention, the first plenum is defined by opposing first and second disk shaped portions of the inner housing, such that the first plenum is a disk shaped cavity extending diametrically across the alternator adjacent a rear end of the alternator. The axial jacket is defined by an inner diameter of the outer housing and an outer diameter of the inner housing, such that the axial jacket forms an annular jacket extending entirely around the alternator. The second plenum is defined by a second disk shaped portion of the inner housing an a disk shaped front portion of the outer housing, such that the second plenum is a disk shaped cavity extending diametrically across the alternator adjacent a front end of the alternator.

In still another aspect of the present invention, an inlet extends from the first plenum and is adapted to allow coolant to enter the first plenum and an outlet extends from the second plenum and is adapted to allow coolant to exit the flow chamber.

In yet another aspect of the present invention, an arcuate notch is formed within the first disk shaped portion of said inner housing defining a first passageway interconnecting the first plenum and the axial jacket and an arcuate notch is formed within the third disk shaped portion of the inner housing defining a second passageway interconnecting the axial jacket and the third plenum. The inlet is positioned diametrically across from the first passageway such that coolant entering the inlet must flow diametrically across the alternator to reach the first passageway. The first passageway is positioned diametrically across from the second passageway such that the coolant entering the axial jacket must flow annularly around the alternator to reach the second passageway. The outlet is positioned diametrically across from the second passageway such that coolant entering the second plenum must travel diametrically across the alternator to reach the outlet.

In yet another aspect of the present invention, the inlet and the outlet are adapted to connect to a coolant system of an automobile such that engine coolant is circulated through the alternator.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
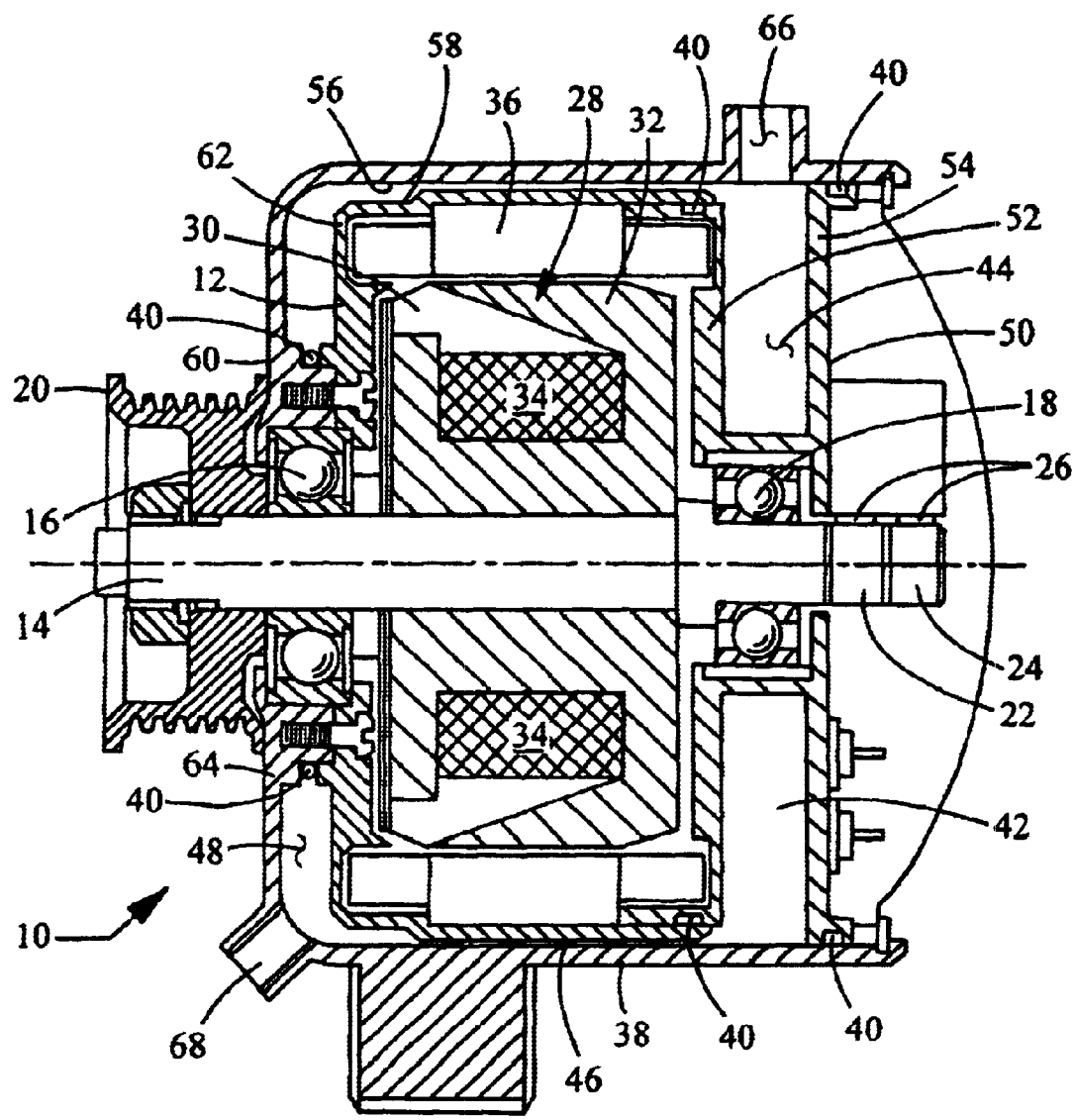
FIG. 1 is a cross-sectional view of a first preferred embodiment of the present invention.

Referring to FIG. 1, an alternator of the present invention is shown generally at 10. The alternator 10 includes an inner housing 12 which is adapted to support internal components of the alternator 10. A rotor shaft 14 is rotatably supported within the inner housing 12 by a pair of bearing elements 16 and 18. A pulley 20 is mounted to a first end of the shaft 14 and is adapted to engage a drive belt (not shown) to provide rotating drive to the shaft 14 of the alternator 10. A pair of slip rings 22 and 24 are mounted to a second end of the shaft 14 and are adapted to engage brushes 26 within the alternator 10.

A rotor assembly 28 is mounted within the inner housing 12. The rotor assembly 28 includes first and second pole pieces 30 and 32 mounted onto the shaft 14. An excitation winding 34 is mounted between the first and second pole pieces 30 and 32. A stator assembly 36 is fixedly mounted within the inner housing 12 in functional engagement with the rotor assembly 28.

An outer housing 38 is mounted over the inner housing 12 and an o-ring 40 is positioned between the inner housing 12 and the outer housing 38, thereby creating a sealed flow chamber 42. The flow chamber 42 includes a first plenum 44, an axial jacket 46 and a second plenum 48. The axial jacket 46 is positioned between and interconnects the first and second plenums 44, 48 allowing fluid communication therebetween.

The first plenum 44 is a disk shaped cavity extending diametrically across the alternator 10 adjacent a rear end 50 of the alternator 10. The first plenum 44 is defined by a first disk shaped portion 52 of the inner housing 12 positioned at a distance from a second disk shaped portion 54 of the inner housing 12 and an inner diameter 56 of the outer housing 38. The axial jacket 46 extends annularly around the entire periphery of the alternator 10 and is defined by the cylindrical inner diameter 56 of the outer housing 38, and a cylindrical outer diameter 58 of the inner housing 12. The axial jacket 46 forms an annular jacket which extends 360 degrees around the alternator 10. The second plenum 48 is a disk shaped cavity extending diametrically across the alternator 10 adjacent a front end 60 of the alternator 10. The second plenum 48 is defined by a third disk shaped portion 62 of the inner housing 12 positioned at a distance from a disk shaped front portion 64 of the outer housing 38.

An inlet 66 extends from the first plenum 44 and is adapted to connect to a source of coolant and to allow coolant to enter the first plenum 44. An outlet 68 extends from the second plenum 48 and is adapted to allow coolant to exit the flow chamber 42. Preferably, the inlet 66 and the outlet 68 are adapted to connect to the coolant system of an automobile. The design of the present invention allows the alternator 10 to be compact enough to be placed upstream of a heater core so that the heat absorbed by the coolant flowing through the alternator 10 is then used in the heater core to provide warm air to the interior of the vehicle. Additionally, the design of the present invention allows the inlet 66 and the outlet 68 to be switched. The cooling of the alternator 10 is equally effective when the flow of coolant is reversed.

Figure 2:
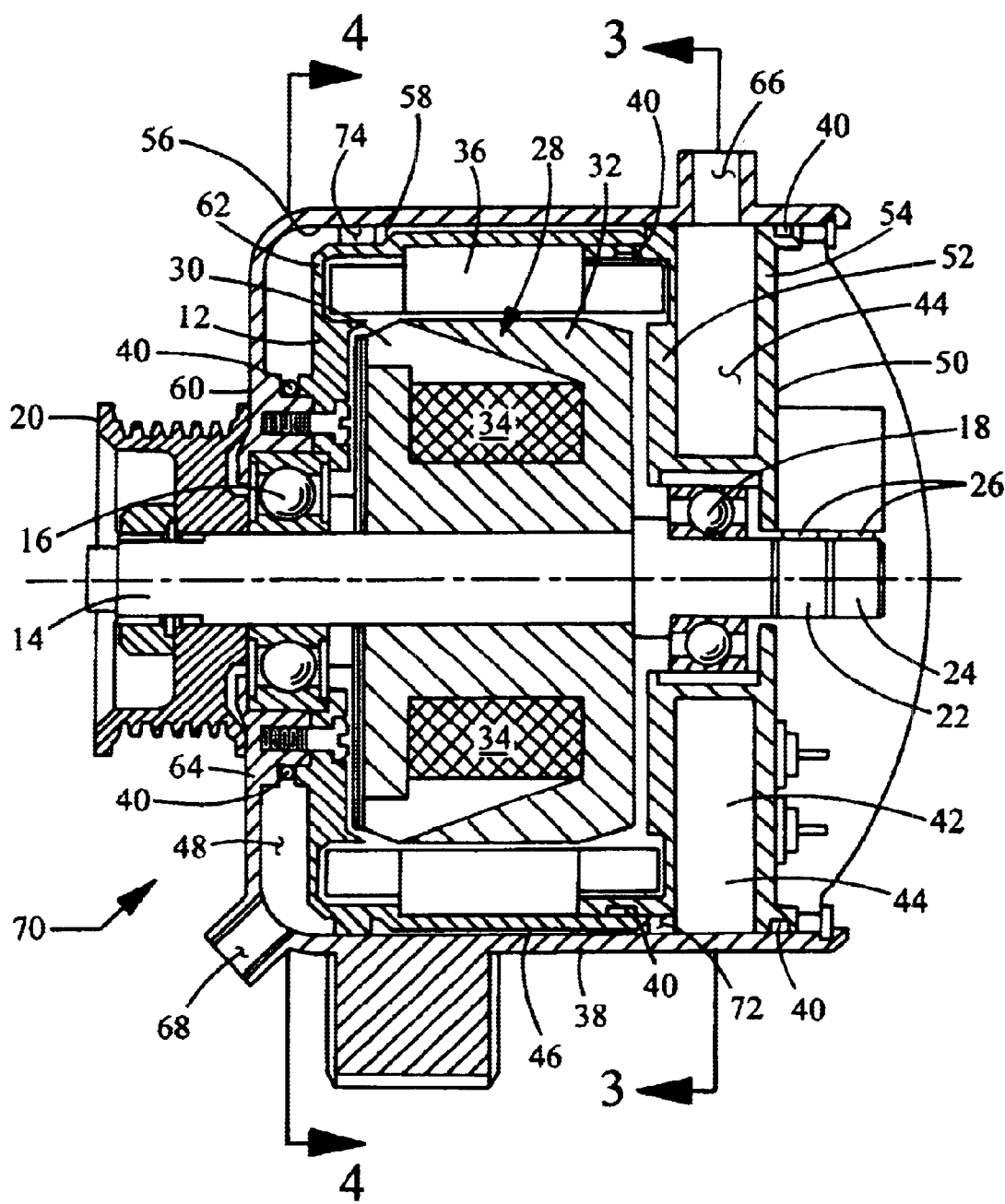
FIG. 2 is a cross-sectional view of a second preferred embodiment of the present invention.

Referring to FIG. 2, a second preferred embodiment of the alternator of the present invention is shown generally at 70. Elements that are the same as those shown in the first preferred embodiment of FIG. 1 are designated by the same reference numbers. The alternator 70 of the second preferred embodiment includes a first passageway 72 positioned between the first plenum 44 and the axial jacket 46 and a second passageway 74 positioned between the axial jacket 46 and the third plenum 48. The first and second passageways 72, 74 direct the coolant flow through the alternator 70 for more efficient cooling of the alternator 70.

Figure 3:
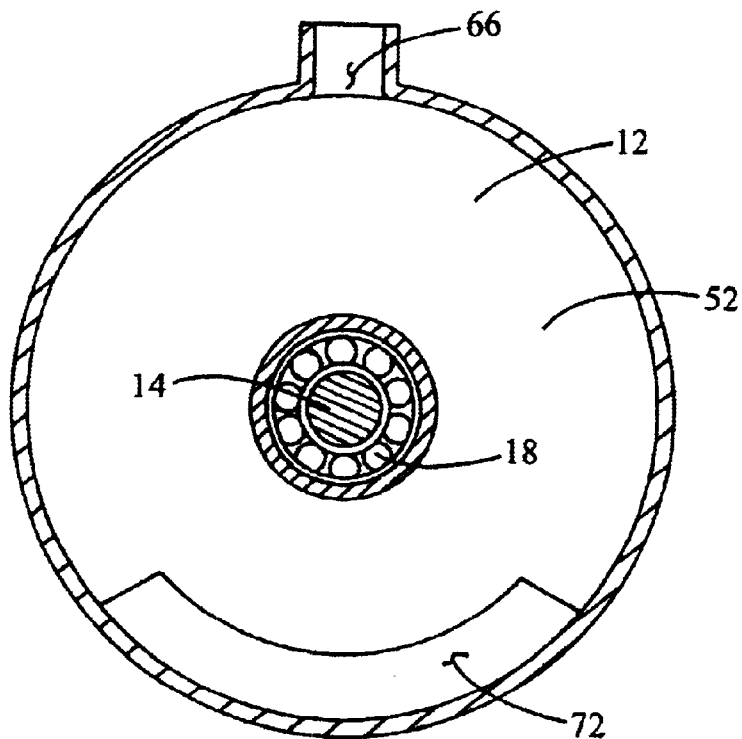
FIG. 3 is sectional view of the alternator of FIG. 2 taken along line 3—3.

Referring to FIG. 3, the first passageway 72 is defined by an arcuate notch formed within the first disk shaped portion 52 of the inner housing 12. Preferably, the first passageway 72 is located diametrically across from the inlet 66 such that coolant flowing into the first plenum 44 from the inlet 66 must flow diametrically across the alternator 70 to reach the first passageway 72. After flowing across the alternator 70, the coolant will then change direction, flowing axially through the first passageway 72 into the axial jacket 46.

Figure 4:
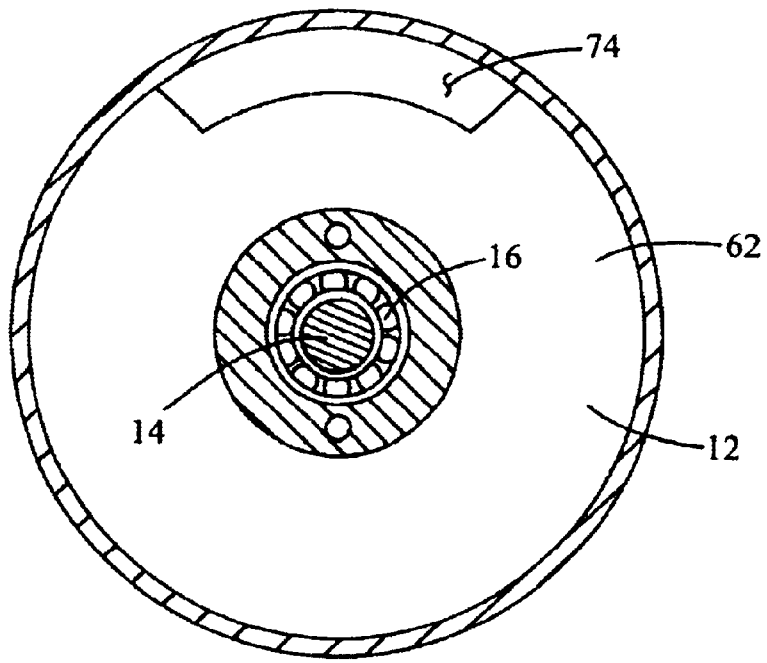
FIG. 4 is sectional view of the alternator of FIG. 2 taken along line 4—4.

Referring to FIG. 4, the second passageway 74 is defined by an arcuate notch formed within the third disk shaped portion 62 of the inner housing 12. Preferably, the second passageway 74 is located diametrically across from the first passageway 72 such that coolant flowing into the axial jacket 46 through the first passageway 72 must flow annularly around the alternator 70 to reach the second passageway 74. The coolant flowing into the axial jacket 46 splits evenly and flows tangentially back toward the second passageway 74 on the opposite side around both sides of the alternator 70. After flowing around the alternator 70, the coolant will then change direction, flowing axially through the second passageway 74 and into the second plenum 48.

Figure 5:
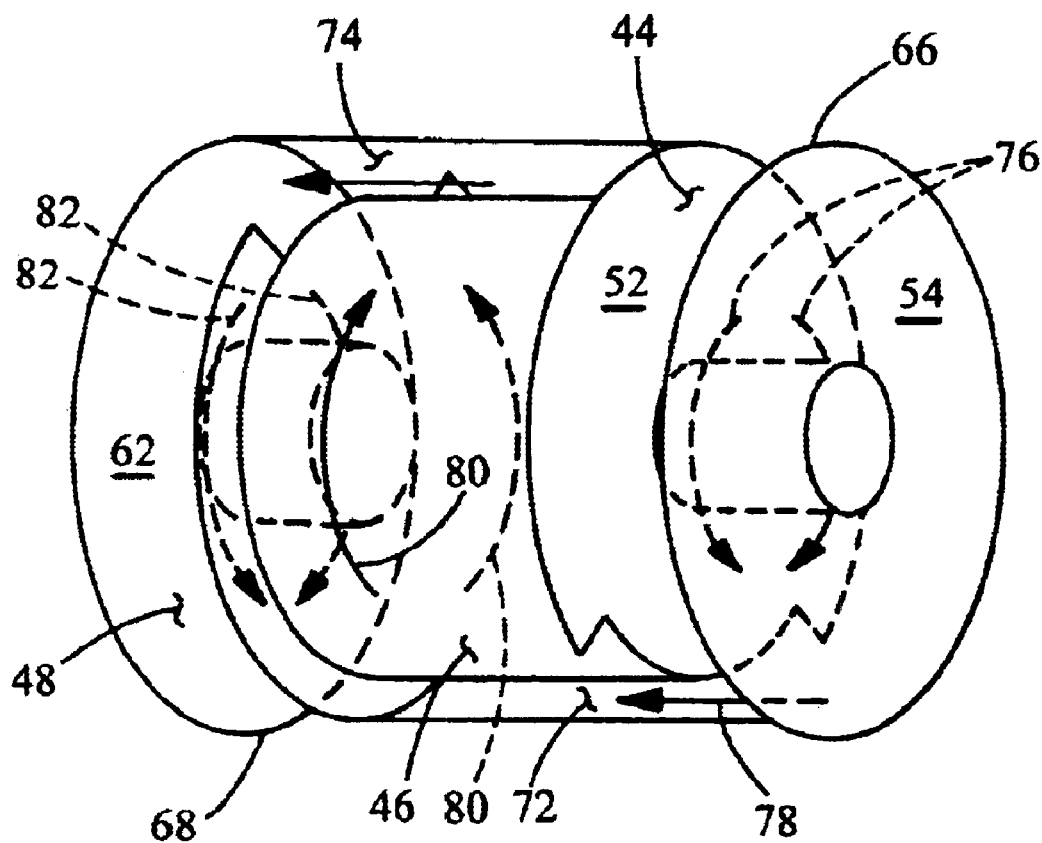
FIG. 5 is a schematic view illustrating the coolant flow through the alternator.

The outlet 68 is preferably located diametrically across from the second passageway such that coolant entering the second plenum 48 must flow diametrically across the alternator 70 to reach the outlet 68. Referring to FIG. 5, a schematic view of the alternator 70 shows how the coolant flows therethrough. The coolant enters the first plenum 44 through the inlet 68 and flows diametrically across the alternator 70 as shown by arrows 76. The coolant then changes direction and flows axially through the first passageway 72 into the axial jacket 46 as shown by arrow 78. The coolant flows annularly around the alternator 70 as shown by arrows 80. The coolant then changes direction and flows axially through the second passageway 74 into the second plenum 48 as shown by arrows 82. Finally, the coolant flows diametrically across the alternator 70 through the second plenum 48 as shown by arrows 84 and exits through the outlet 68.

While the above description constitutes the preferred embodiments of the present invention, it will be appreciated that the invention is susceptible to modification, variation and change without departing from the proper scope and fair meaning of the accompanying claims.

We claim:

1. An alternator comprising:

an inner housing; and an outer housing mounted over said inner housing;

said inner housing and said outer housing defining a flow chamber including a disk shaped first plenum extending diametrically across said alternator, an axial jacket extending annularly around said inner housing of said alternator, a disk shaped second plenum extending diametrically across said alternator; an inlet extending from said first plenum adapted to allow coolant to enter said first plenum, and an outlet extending from said second plenum adapted to allow coolant to exit said flow chamber, said inlet and said outlet being adapted to connect to a coolant system of an automobile such that engine coolant is circulated through said alternator;

said first plenum being defined by opposing first and second disk shaped portions of said inner housing such that said first plenum is a disk shaped cavity extending diametrically across said alternator adjacent a rear end of said alternator, said second plenum being defined by a third disk shaped portion of said inner housing and a disk shaped front portion of said outer housing such that said second plenum is a disk shaped cavity extending diametrically across said alternator adjacent a front end of said alternator;

said axial jacket being defined by an inner diameter of said outer housing and an outer diameter of said inner housing such that said axial jacket forms an annular jacket extending substantially around said alternator, said axial jacket being disposed between and interconnecting said first plenum and said second plenum such that said first plenum, said axial jacket, and said second plenum are in fluid communication with one another; and said first disk shaped portion including an arcuate notch formed therein defining a first passageway that interconnects said first plenum and said axial jacket and said third disk shaped portion including an arcuate notch formed therein defining a second passageway that interconnects said axial jacket and said second plenum.

2. The alternator of claim 1 wherein said first passageway is located diametrically across from said inlet such that coolant entering said first plenum must flow diametrically across said alternator to reach said first passageway.

3. The alternator of claim 1 wherein said second passageway is located diametrically across from said first passageway, such that coolant entering said axial jacket through said first passageway must flow annularly around said alternator to reach said second passageway.

4. The alternator of claim 1 wherein said outlet is located diametrically across from said second passageway, such that coolant entering said second plenum through said second passageway must flow diametrically across said alternator to reach said outlet.

5. The alternator of claim 1 further comprising:

a shaft rotatably supported within said inner housing by a pair of bearing elements, having a pulley mounted to a first end and a pair of slip rings mounted to a second end;

a rotor assembly including first and second pole pieces mounted onto said shaft with an excitation winding mounted between said first and second pole pieces;

a stator assembly fixedly mounted within said inner housing in functional engagement with said rotor assembly.

6. An alternator comprising:

an inner housing;

an outer housing mounted over said inner housing;

said inner housing and said outer housing defining a sealed flow chamber having a first plenum, an axial jacket, a second plenum, a first passageway interconnecting said first plenum and said axial jacket, a second passageway interconnecting said axial jacket and said second plenum, an inlet extending from said first plenum, and an outlet extending from said second plenum;

said first plenum being defined by opposing first and second disk shaped portions of said inner housing such that said first plenum is a disk shaped cavity extending diametrically across said alternator adjacent a rear end of said alternator, said axial jacket being defined by an inner diameter of said outer housing and an outer diameter of said inner housing such that said axial jacket forms an annular jacket extending substantially around said inner housing of said alternator between and interconnecting said first and second plenums, said second plenum being defined by a third disk shaped portion of said inner housing and a disk shaped front portion of said outer housing such that said second plenum is a disk shaped cavity extending diametrically across said alternator adjacent a front end of said alternator;

said first passageway being defined by an arcuate notch formed within said first disk shaped portion of said inner housing diametrically across from said inlet such that coolant entering said first plenum must flow diametrically across said alternator to reach said first passageway, and said second passageway being defined by an arcuate notch formed within said third disk shaped portion of said inner housing diametrically across from said first passageway such that coolant entering said axial jacket through said first passageway must flow annularly around said alternator to reach said second passageway;

said outlet being located diametrically across from said second passageway such that coolant entering said second plenum through said second passageway must flow diametrically across said alternator to reach said outlet.

7. The alternator of claim 6 wherein said inlet and said outlet are adapted to connect to a coolant system of an automobile such that engine coolant is circulated through said alternator.

8. The alternator of claim 6 further comprising:

a shaft rotatably supported within said inner housing by a pair of bearing elements, having a pulley mounted to a first end and a pair of slip rings mounted to a second end;

a rotor assembly including first and second pole pieces mounted onto said shaft with an excitation winding mounted between said first and second pole pieces;

a stator assembly fixedly mounted within said inner housing in functional engagement with said rotor assembly.

* * * * *